United States Patent
Nunnink et al.

(10) Patent No.: US 10,116,870 B1
(45) Date of Patent: Oct. 30, 2018

(54) SINGLE CAMERA VISION SYSTEM FOR LOGISTICS APPLICATIONS

(71) Applicant: Cognex Corporation, Natick, MA (US)

(72) Inventors: Laurens Nunnink, Simpleveld (NL);
Esther Oteo Lozano, Aachen (DE);
Richard Reuter, Wuerselen (DE);
Matthew D. Engle, Watertown, MA (US)

(73) Assignee: Cognex Corporation, Natick, MA (US)

( * ) Notice: Subject to any disclaimer, the term of this patent is extended or adjusted under 35 U.S.C. 154(b) by 218 days.

(21) Appl. No.: 14/750,871

(22) Filed: Jun. 25, 2015

(51) Int. Cl.
*H04N 5/232* (2006.01)
*H04N 5/225* (2006.01)
*H04N 7/18* (2006.01)

(52) U.S. Cl.
CPC ....... *H04N 5/23296* (2013.01); *H04N 5/2254* (2013.01); *H04N 7/183* (2013.01)

(58) Field of Classification Search
CPC .................................................. H04N 5/23296
USPC .......................................................... 348/86
See application file for complete search history.

(56) References Cited

U.S. PATENT DOCUMENTS

| | | | |
|---|---|---|---|
| 3,714,435 A | 1/1973 | Bestenreiner et al. | |
| 5,856,888 A | 1/1999 | Ross et al. | |
| 6,688,525 B1 | 2/2004 | Nelson et al. | |
| 7,196,719 B2 | 3/2007 | Koselka et al. | |
| 8,139,935 B2 | 3/2012 | Pace et al. | |
| 8,355,627 B2 | 1/2013 | Pace et al. | |
| 8,773,766 B2 * | 7/2014 | Jannard ..................... | G02B 3/14 359/666 |
| 2006/0007550 A1 * | 1/2006 | Tonar ...................... | B60R 1/088 359/604 |
| 2009/0072037 A1 * | 3/2009 | Good ....................... | G02B 3/14 235/462.35 |
| 2010/0044555 A1 * | 2/2010 | Ohara ..................... | G02B 27/46 250/216 |
| 2011/0317006 A1 * | 12/2011 | Kuboyama .......... | G06K 9/0057 348/140 |
| 2014/0098220 A1 * | 4/2014 | Nunnink ................ | H04N 5/232 348/135 |

* cited by examiner

*Primary Examiner* — Jamie Atala
*Assistant Examiner* — Kathleen Nguyen
(74) *Attorney, Agent, or Firm* — Loginov IP (57) ABSTRACT

This invention provides a single-camera vision system, typically for use in logistics applications, that allows for adjustment of the camera viewing angle to accommodate a wide range of object heights and associated widths moving relative to an imaged scene with constant magnification. The camera assembly employs an image sensor that is more particularly suited to such applications, with an aspect (height-to-width) ratio of approximately 1:4 to 1:8. The camera assembly includes a distance sensor to determine the distance to the top of each object. The camera assembly employs a zoom lens that can change at relatively high speed (e.g. <10 ms) to allow adjustment of the viewing angle from object to object as each one passes under the camera's field of view (FOV). Optics that allow the image to be resolved on the image sensor within the desired range of viewing angles are provided in the camera lens assembly.

19 Claims, 6 Drawing Sheets

SINGLE CAMERA VISION SYSTEM FOR LOGISTICS APPLICATIONS

FIELD OF THE INVENTION

This invention relates to machine vision systems and more particularly to vision systems used in logistics applications to track packages and other objects moving through a handling facility, typically on a conveyor arrangement.

BACKGROUND OF THE INVENTION

Machine vision systems (also termed "vision systems") that perform measurement, inspection, alignment of objects and/or decoding of symbology (e.g. bar codes—also termed "IDs") are used in a wide range of applications and industries. Such IDs are applied in a variety of formats (e.g. one-dimensional (1D), two-dimensional (2D), QR-code, DataMatrix, DotCode, etc.). These systems are based around the use of an image sensor (or "imager"), which acquires images (typically grayscale or color, and in one, two or three dimensions) of the subject or object, and processes these acquired images using an on-board or interconnected vision system processor. The processor generally includes both processing hardware and software, in the form of non-transitory computer-readable program instructions, which perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes. The image is processed to identify barcode features, which are then decoded by a decoding process and/or processor obtain the inherent alphanumeric data represented by the code.

A common use for ID readers is to track and sort objects (e.g. packages) moving along a line (e.g. a conveyor) in manufacturing and logistics operations. The ID reader can be positioned over the line at an appropriate viewing angle and distance to acquire any expected IDs on respective objects as they each move through the field of view. The focal distance of the reader with respect to the object can vary, depending on the placement of the reader with respect to the line and the size of the object. That is, a taller object may cause IDs thereon to be located closer to the reader, while a lower/flatter object may contain IDs that are further from the reader. In each case, the ID should appear with sufficient resolution to be properly imaged and decoded. Thus, the field of view of a single reader, particularly in with widthwise direction (perpendicular to line motion) is often limited. Where an object and/or the line is relatively wide, the lens and sensor of a single ID reader may not have sufficient field of view in the widthwise direction to cover the entire width of the line while maintaining needed resolution for accurate imaging and decoding of IDs. Failure to image the full width can cause the reader to miss IDs that are outside of the field of view.

In certain cases, the field of view of the camera system can be widened (in a direction transverse to motion), often while narrowing the resolution (number of image pixels) in the motion direction by implementing a field of view (FOV) expander. One such expander system is shown and described, by way of useful background in U.S. Published Patent Application No. US-2013-0201563-A1, entitled SYSTEM AND METHOD FOR EXPANSION OF FIELD OF VIEW IN A VISION SYSTEM.

However this approach is cumbersome in many applications and is often more suited to situations where the camera system must image a relatively wide line, rather than a line that includes both higher and lower boxes.

Figure 1:
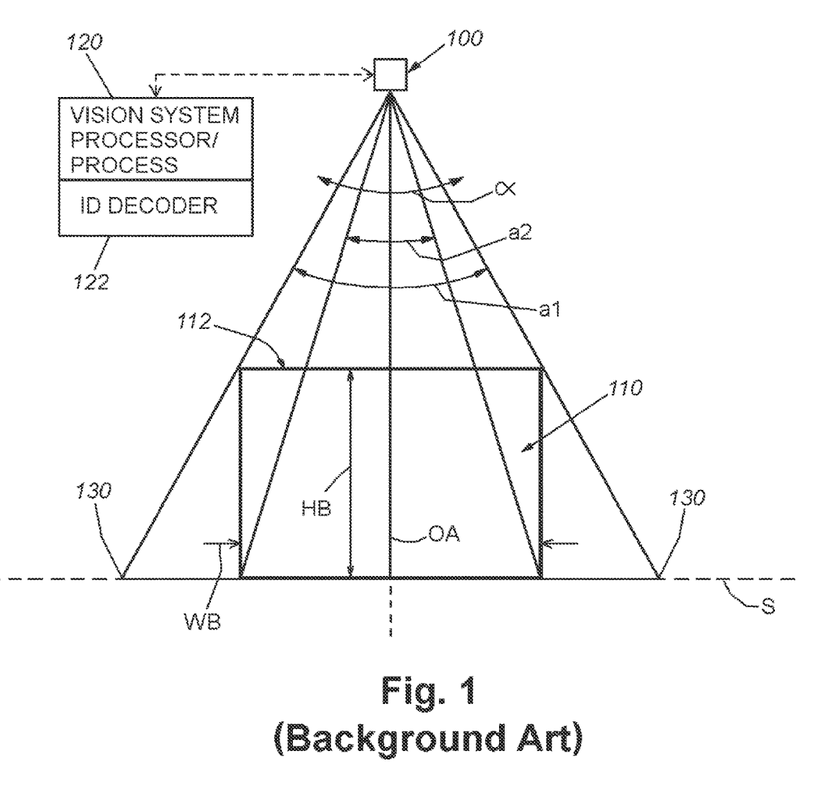
FIG. 1 is a diagram of an object (box) of predetermined width on a moving conveyor line imaged by a vision system showing relative viewing angles at minimum and maximum height, by way of useful background.

The problem is further illustrated in FIG. 1, which shows a camera assembly 100 that is aligned along an optical axis OA with respect the a moving surface S. The surface moves in the direction of the page, and thus the width across the line is shown in this example. The camera assembly 100 acquires an image of a scene containing a box or similar object 110 with a top surface 112 that can contain one or more IDs requiring decoding by the camera system and associated vision system processes 120 (including an ID-decoding process 122). The height HB of the subject box 110 is shown as well as the width WB. In runtime, the actual height of the box can be varied between approximately 0 (a flat object on the conveyor S) and a maximum height (approximately HB). The viewing angle $\alpha$ of the camera assembly 100 should be set to image the full width of the box at a given maximum height. Thus, a viewing angle a1 sufficiently covers the entire top surface 112 of the box 110. However, by setting the viewing angle to a1, the field of view is significantly larger (often 1.5 to 2 times larger) than the field of view needed to cover the dimensions of a flatter object with a height closer to 0 and width WB. These "wasted" image pixels on the opposing ends of the image sensor's field of view is indicated by boundary points 130. Thus, to adequately image a flatter object, a narrower viewing angle a2 can be employed.

Typically, there is a similar "waste" of pixels for flatter objects along the transport direction (into and out of the page of FIG. 1) due to the need for a narrower viewing angle. In addition, waste of image pixels in the transport direction results because the required filed of view along this dimension is generally defined by the feature that must be captured in an image. That is, the image should span the entire width of the object, but need only be tall enough to capture the height of the particular features found within the overall object width (e.g. an ID). This is, because multiple images are captured as the object passes under the camera (in the transport direction), and at least one or more of the captured images will contain the feature. In a typical logistics ID-reading application, the length of a barcode is usually 75 mm, so a field of view of 100 mm would sufficiently in this direction. However, most commercially available sensors have a width/height aspect ratio of 4:3, 5:4 or 16:9, each of which ratios features a relatively large height dimension versus width. Thus, when such a sensor is used to cover the width of the conveyor belt (and maximum object width at all heights), the field of view in the transport direction is usually much larger than desired.

Thus prior art, conventional single camera vision system for logistics applications disadvantageously use a large number of pixels inefficiently. This inefficiency results from the fixed opening angle of the camera and the aspect ratio of the sensor. However, adjusting the camera assembly's viewing angle to suit a given height of object is challenging, both in terms of accuracy and speed of adjustment.

SUMMARY OF THE INVENTION

This invention overcomes disadvantages of the prior art by providing a single-camera vision system, typically for use in logistics applications, that allows for adjustment of the camera viewing angle to accommodate a wide range of object heights and associated widths moving relative to an imaged scene. The camera assembly employs an image sensor that is more particularly suited to such applications, with an aspect (height-to-width) ratio of approximately 1:4 to 1:8. The camera assembly includes a distance sensor, such as a laser range finder, stereo-optics, etc. to determine the distance to the top of each object. The camera assembly employs a zoom lens that can change at relatively high speed (e.g. <10 ms) to allow adjustment of the viewing angle from object to object as each one passes under the camera's field of view (FOV). Such a lens can be illustratively based on moving-membrane liquid lens technology. Optics that allow the image to be resolved on the image sensor within the desired range of viewing angles—as adjusted by the zoom lens—are provided in the camera lens assembly.

In an illustrative embodiment, a vision system for acquiring images of features of objects of varying height passing under a camera field of view in a transport direction is provided. The vision system includes a camera with an image sensor having a height:width aspect ratio of at least 1:4. A lens assembly is in optical communication with the image sensor. The lens assembly has an adjustable viewing angle at constant magnification within a predetermined range of working distances. A distance sensor measures a distance between camera and at least a portion of object, and an adjustment module adjusts the viewing angle based upon the distance. Illustratively, the adjustment module can adjust a focal distance of the lens assembly concurrently with the viewing angle. The lens assembly can have a variable lens element that changes focal distance based upon an input adjustment value, and the variable lens element can comprise a liquid lens based on various concepts, such as the use of two iso-density fluids or a moving membrane. Alternatively, an electromechanical variable lens can be employed. Illustratively, the lens assembly has a front lens group and a rear lens group, behind the front lens group, in which the front lens group is larger in diameter than the rear lens group, and wherein the variable lens element is located behind the rear lens group. The front lens group can include a front convex lens and a rear composite lens. The rear lens group can have a composite lens. Illustratively, an aperture having a predetermined diameter is located between the front lens group and the rear lens group. This enables the system to operate with a small-diameter, commercially available variable lens. In embodiments, a front lens of the front lens group and a front lens of the rear lens group are separated by approximately 75 millimeters and the aperture has a diameter of approximately 4 millimeters. These measurements are highly variable in various implementations. The vision system can also include a vision processor that analyzes the features and performs a vision system task based upon the features. In embodiments, the features are ID features, and the vision processor includes an ID decoder module. Illustratively, the camera is a single unit that images objects within a field of view thereof having varying heights and an ID located thereon. The camera can be arranged to image a top side of an object in relative motion, the top side being within a predetermined range of heights, and the object can be arranged on a moving conveyor. Alternatively, the camera can be arranged to move relative to a stationary or moving object. The top side of the object can include at least one ID thereon and the vision system can include a vision system processor that includes an ID decoder module. The distance sensor can be based on at least one of LIDAR, sonar, stereo imaging, a light curtain and laser range-finding. Additionally, the image sensor can define a height:width aspect ratio of at least approximately 1:8.

BRIEF DESCRIPTION OF THE DRAWINGS

The invention description below refers to the accompanying drawings, of which.

DETAILED DESCRIPTION

Figure 2:
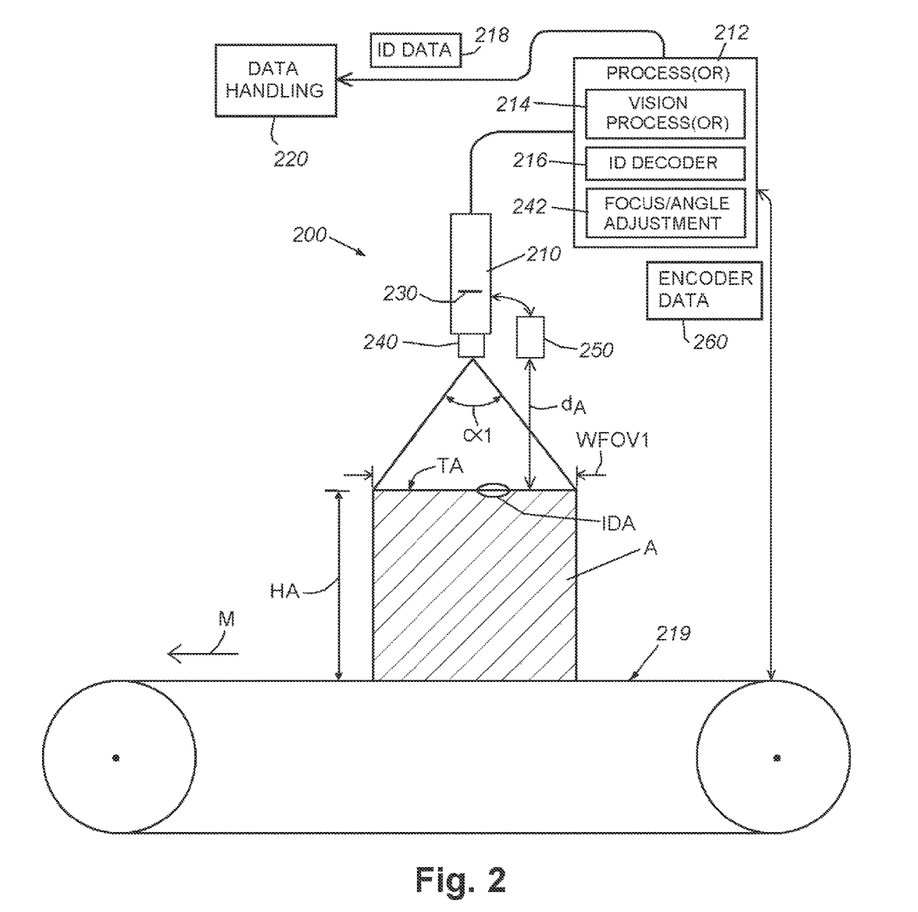
FIG. 2 is a diagram of a single camera vision system according to an illustrative embodiment acquiring an image of an object having a first height on a moving conveyor line.

Reference is made to FIG. 2, which depicts a logistics arrangement 200, which includes a single vision system camera 210 that can include an on-board or remote processor 212 with an associated vision system process/processor 214, and in this embodiment, an ID decoder process/processor 216 is included to identify, decode and generate data 218 from an ID (e.g. a 1D or 2D barcode, etc.). This data 218 is provided a data handling system 220 to perform one or more data handling tasks including, but not limited to tracking/routing of items, quality control, and item-acceptance/rejection. These tasks can be performed by a downstream computing device (e.g. a PC, server or cloud-computing arrangement, and/or by specific mechanisms, such as a conveyor system 219 with sorting gates that direct objects in response to data contained in those objects' respective IDs.

Images are acquired by an image senor, or "imager", 230 from light focused from the imaged scene by a camera lens assembly 240. As described below, the lens assembly includes a quick-acting auto-focus and auto-adjust mechanism that responds distance measurements and thereby rapidly adjusts the lens assembly to the proper focus and viewing angle for an object of a predetermined height. The arrangement 200 includes, in the overall processor 212, a focus/viewing-angle adjustment process(or) 242 that provides adjustment information to the camera 230 and/or lens assembly 240.

In the example of FIG. 2, an object (e.g. a box or package) A has a height HA for which the top surface TA is fully imaged using a focus angle α1. Typically, this viewing angle is sufficient to cover the width of the package at the height HA (in the direction orthogonal to the depicted upstream-to-downstream motion/transport direction indicated by arrow M). The viewing angle α1 and associated focal distance is set based upon a distance measurement dA from the camera image plane (or other camera-based reference point) to the object top surface TA. A distance-measuring device 250 determines the distance dA. In this embodiment, it is located upstream of the camera at a predetermined position that facilitates registration of object height data within the vision system in advance of arrival of the object A at the camera field of view. The conveyor 219 can be operatively connected to an encoder or similar motion-tracking device that provides encoder data 260 (relative to conveyor motion) to the processor 212. This data can be used to time arrival of objects at the field of view after they are detected by, for example, the distance-measuring device 250. Illustratively, the distance-measuring device 250 can be implemented using a variety of technologies—for example, a sonar or LIDAR system, stereoscopic imaging, a light curtain or combination of such technologies. While not shown, the arrangement 200 can include appropriate illumination, implemented as an integrated unit with the camera 230 and/or separately mounted.

Figure 3:
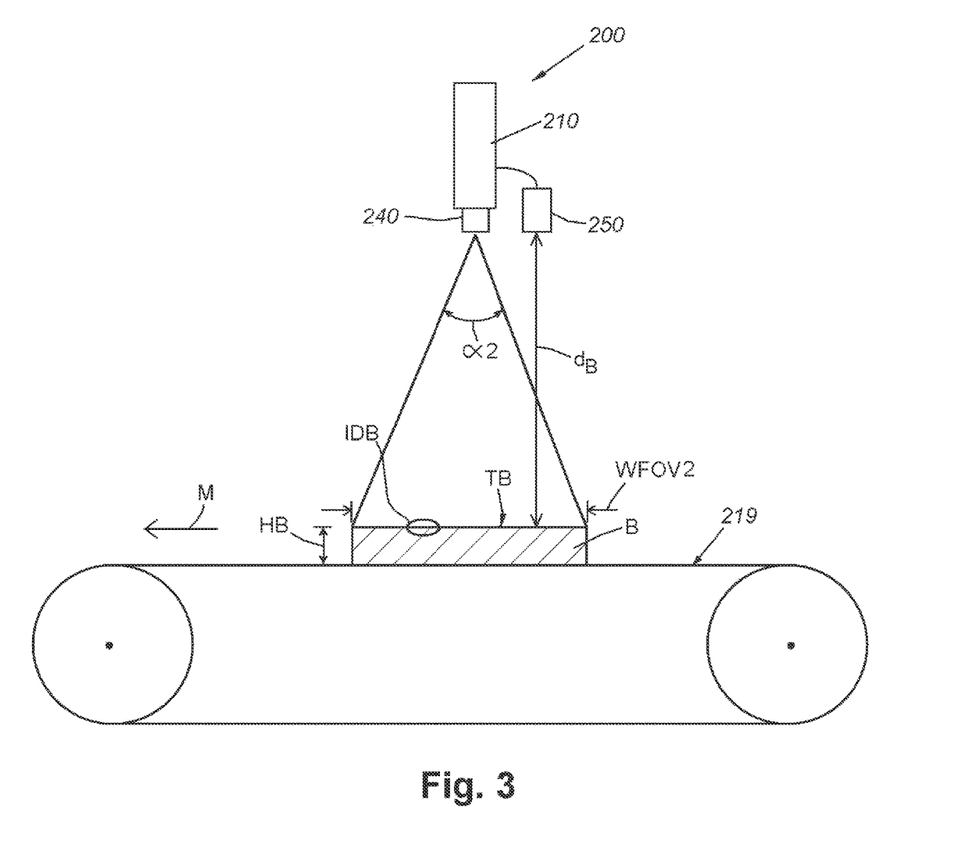
FIG. 3 is a diagram of a single camera vision system according to an illustrative embodiment acquiring an image of an object having a second height, lower that the first height (FIG. 2) on a moving conveyor line.

One or more of the sides of the object A can include one or more IDs or similar data structures (indicated by circled region IDA), respectively. These IDs are desirably captured by the vision system camera 210 and associated processor 212. Referring to FIG. 3, an object B with lower-height HB (than the height HA of the first object A) is shown transported by the conveyor 219 into the field of view of the camera 210. The distance-measurement device 250 reports a distance dB from the top surface TB. In this example, the distance dB is greater than dA, indicating a lower-height object. Thus, the viewing angle α2 is lower than the angle α1. The angle adjustment between α2 and α1 is directed by the processor based upon the distance measurement. The focus/viewing-angle adjustment process(or) 242 can employ a variety of techniques to provide the desired viewing angle adjustment value α. Note that the maximum viewing angle α is defined generally by the width of the conveyor (e.g. conveyor belt), corresponding to WFOV1 and WFOV2 and the height of the largest object. The desired resolution of the vision system camera is defined by the smallest feature at the greatest distance, generally controlled by the height of the smallest/lowest object and smallest ID thereon. Note that in most logistics applications, the field of view at the level of the conveyor is at least 1.5 to 2 times larger than needed to cover the width of the conveyor at maximum object height. Thus, for any object on the conveyor that is less than maximum height, failure to adjust the viewing angle essentially results in wasted pixels for the portions of an acquired image residing outside the edges of the conveyor and object.

To determine the viewing angle α for a given distance d and a predetermined maximum conveyor width w (corresponding to the field of view that fully images the conveyor width) the following equation:

$$\alpha = \arctan(w/d)$$

The adjustment process 242 can use this straightforward equation to compute the viewing angle setting in the lens assembly 240. Likewise, the distance d can be used to control focus within the lens assembly using an appropriate equation. In alternate embodiments, equations can be expressed in one or more associated lookup tables in which a value d is mapped to a stored coefficient.

Note, as used herein various directional and orientational terms such as "vertical", "horizontal", "up", "down", "bottom", "top", "side", "front", "rear", "left", "right", "length", "width", "height", and the like, are used only as relative conventions, and not as absolute orientations with respect to a fixed coordinate system, such as the acting direction of gravity.

It is also contemplated that the sensor 230 (FIG. 2) can be implemented using an aspect ratio that is customized to this application. In general, the height of the sensor in the transport direction can be significantly smaller than the width since multiple images can be acquired as an object moves along the transport direction, ensuring that one or more images can fully capture the ID in this direction. However, the sensor should fully image the entire width of the conveyor and associated object in each acquired image since there is no relative movement of objects in the width direction that would otherwise enable multiple images to stitch together a full view of an object. Illustratively a sensor having a height:width aspect of between 1:4 and 1:8 is desirable. More generally an aspect ration of "at least" 1:4 and potentially "larger" (e.g. 1:6, 1:8, etc.) is desired in various embodiments. Those of skill will recognize that sensor manufacturers, such as CMOSIS of Belgium, can produce sensors with such specialized aspect ratios. Alternatively a conventionally sourced 16:9 aspect sensor can be used in various embodiments to achieve improved performance in the depicted logistics arrangement.

A numerical example of the required number of pixels in a typical logistics application is now described. Typically, in a conventional arrangement, appropriate imaging of an 80 cm object by a camera mounted 160 cm above the conveyor requires a sensor of approximately 6400×3200 pixels, totaling 23 Mpixels. This assumes an ID having a size of 10 MIL and 1 PPM resolution. By employing an adjustable-viewing-angle arrangement according to an embodiment with an 8:1 sensor with 3200×400 pixels, the total pixel count is approximately 1.44 Mpixels. This arrangement results in a substantially lower pixel count, thereby allowing for faster processing of images and a less involved sensor interface.

The adjustment process(or) 242 is particularly arranged to enable adjustment of both viewing angle and focal distance (focus) concurrently. This can be accomplished using one or more variable focus lenses as described below. In general, it is recognized that at the ranges specified above, the focal distance and viewing angle tend to be closely correlated.

Figure 4:
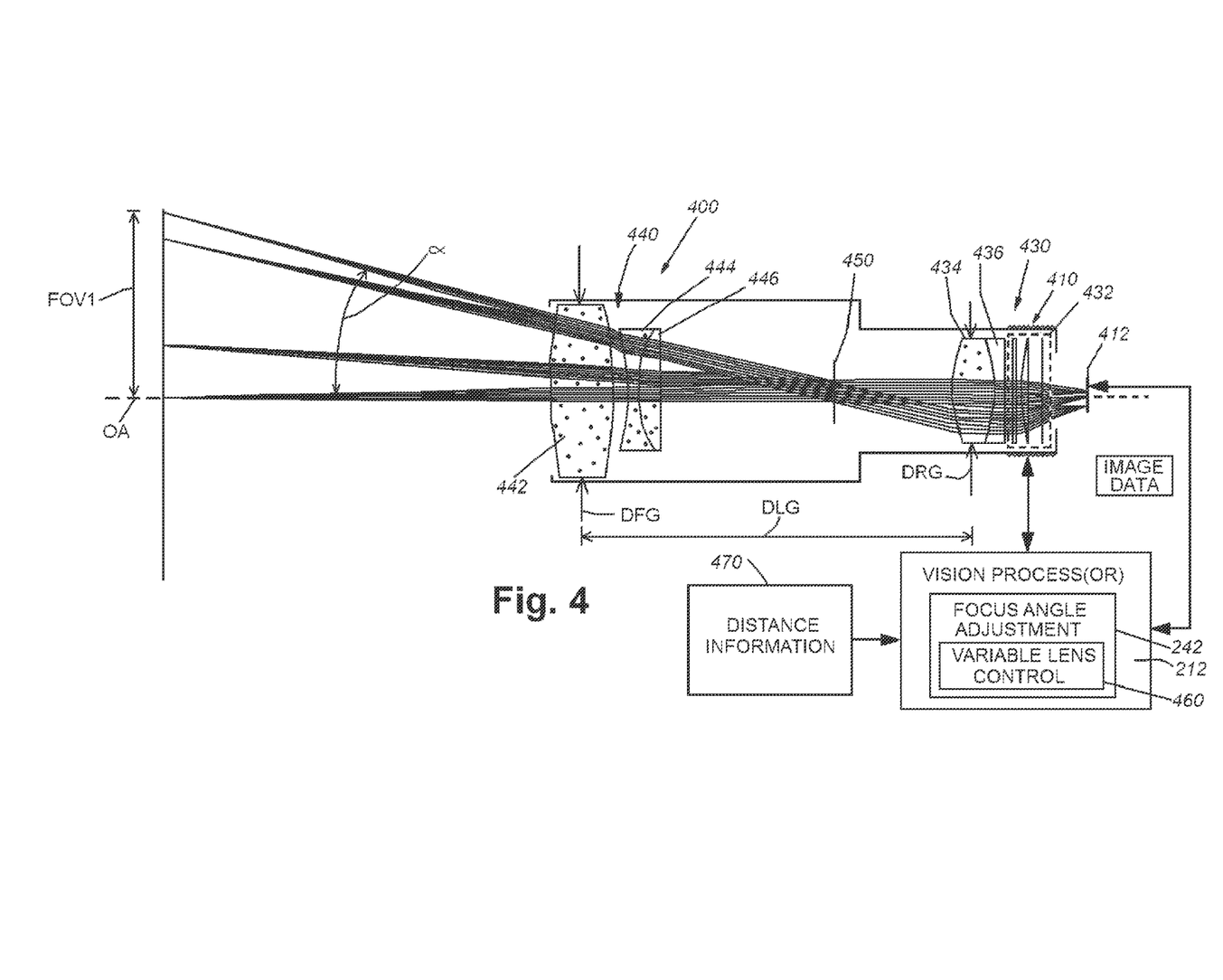
FIG. 4 is a side cross section of a lens arrangement and imager for use in the single camera vision system of FIGS. 2 and 3, according to an illustrative embodiment.

Reference is now made to FIG. 4, which shows the lens assembly 240 according to an illustrative embodiment in further detail. This lens assembly is illustratively based upon a fast-acting focal length adjustment using a liquid lens. The liquid lens can be based upon a variety of technologies (i.e. two isodensity fluids with a boundary layer—available generally from Varioptic of France and moving membrane technology—available generally from Optotune of Switzerland. Moving membrane lens technology is employed in the lens assembly of the illustrative embodiment.

Reference is now made to FIG. 4, which shows an illustrative optical arrangement (lens assembly) 400 (e.g. an integrated lens assembly for attachment to a vision system camera housing using an appropriate base, such as C-mount, M12, etc., threaded base 410) that provides a constant FOV at varied working distances according to illustrative embodiments herein. The base 410 allows the lens assembly to reside at a predetermined distance from the imager 412, which provides the desired FOV and working distance. It is expressly contemplated that the optical arrangement can be constructed in a variety of manners that rely in whole, or in part, upon ordinary skill, and the depicted arrangement is illustrative of such varied arrangements. The lens assembly can include an appropriate electrical connector to interface with the camera body and provide appropriate signals to and from the variable (liquid) lens and other components (e.g. a temperature probe, etc.)

The lens assembly 400 includes a (rear) liquid (or other variable) lens group 430, consisting of the liquid lens unit (described above—indicated by dashed box 432) and associated lenses 434 and 436 that focus the received light from the front lens group 440. The front lens group 430 defines an enlarged diameter DFG relative to the rear lens group diameter DRG. Also notably, the assembly 400 includes an aperture 450 that can be positioned at an appropriate location along the optical axis OA) to compensate for the relatively small diameter (e.g. 10 millimeters or less) of the liquid lens assembly 432. The rear lens group 430 in this embodiment illustratively consists of a front convex lens 434 and matched concave lens 436 that collectively define a compound lens. The front lens group 440 comprises a front convex lens 442 and a rear composite convex and concave lens 444 and 446, respectively. In an embodiment the approximate lens parameters for lenses 434, 436, 442, 444, 446, and (aperture) 450 are as follows:

| Lens Reference No. | Focal length | Diameter | Distance to Next Surface |
| --- | --- | --- | --- |
| 442 | 49.604 mm | 38 mm | 4 mm |
| 444 | −47.675 mm | 26 mm | 0 mm |
| 446 | −1930.735 mm | 26 mm | 45 mm |
| 450 | — | 4 mm | 30 mm |
| 434 | 34.7 mm | 20 mm | 0 mm |
| 436 | 407.456 mm | 20 mm | 2 mm |

The lenses in the two groups 430 and 440 are spaced to provide the depicted FOV (FOV1) at the desired range of working distances. In this illustrative arrangement, the lens groups are separated by a distance DLG of approximately 75 mm along the optical axis OA. By way of further non-limiting example, the radii of curvature and thickness of each lens can be defined as follows (where "front" is facing toward an object and "rear" is facing toward the image sensor, and the (+/−) sign of the radius of curvature represents relative direction of the curvature):

| Lens Reference | Surface | Radius of Curvature | Illustrative Lens Material | Thickness to Next Surface |
| --- | --- | --- | --- | --- |
| 442 | Front | 74.78 mm | N-SF11 | 16.00 mm |
| 442 | Rear | −74.78 mm | N-SF11 | 4.00 mm |
| 444 | Front | −27.82 mm | N-BAF10 | 3.00 mm |
| 444 | Rear | 19.65 mm | N-BAF10 | 0.00 |
| 446 | Front | 19.65 mm | N-SF10 | 5.50 mm |
| 446 | Rear | 201.68 mm | N-SF10 | 45.00 mm |
| 450 | Front | — | Varied | 30.00 mm |
| 450 | Rear | — | Varied | |
| 434 | Front | 21.17 mm | N-BAF10 | 11.04 mm |
| 434 | Rear | −16.08 mm | N-BAF10 | 0.00 mm |
| 436 | Front | −16.08 mm | N-SF10 | 3.00 mm |
| 436 | Rear | −118.66 mm | N-SF10 | 2.00 mm |

Note that the above-described lens (and aperture) parameters should be taken by way of non-limiting example in an illustrative embodiment of the lens assembly employed in the vision system. For example, illustrative lens materials are provided as this affects optical performance, but a wide range of materials with various properties can be employed and lens shapes can be modified in accordance with skill in the art to accommodate different material properties. The aperture material can be varied as appropriate (e.g. polymer, metal, etc. with appropriate thermal stability. The listed lens parameters can also vary based upon differences in working distance range, viewing angle range, variable lens specifications (e.g. diameter, focal range) and/or relative diameters of the lenses in each lens group. The parameters of one or more lens (and aperture) components, and their relative spacing along the optical axis can be varied using conventional optics principles to accommodate changes in one or more of these parameters and measurements.

Figure 5:
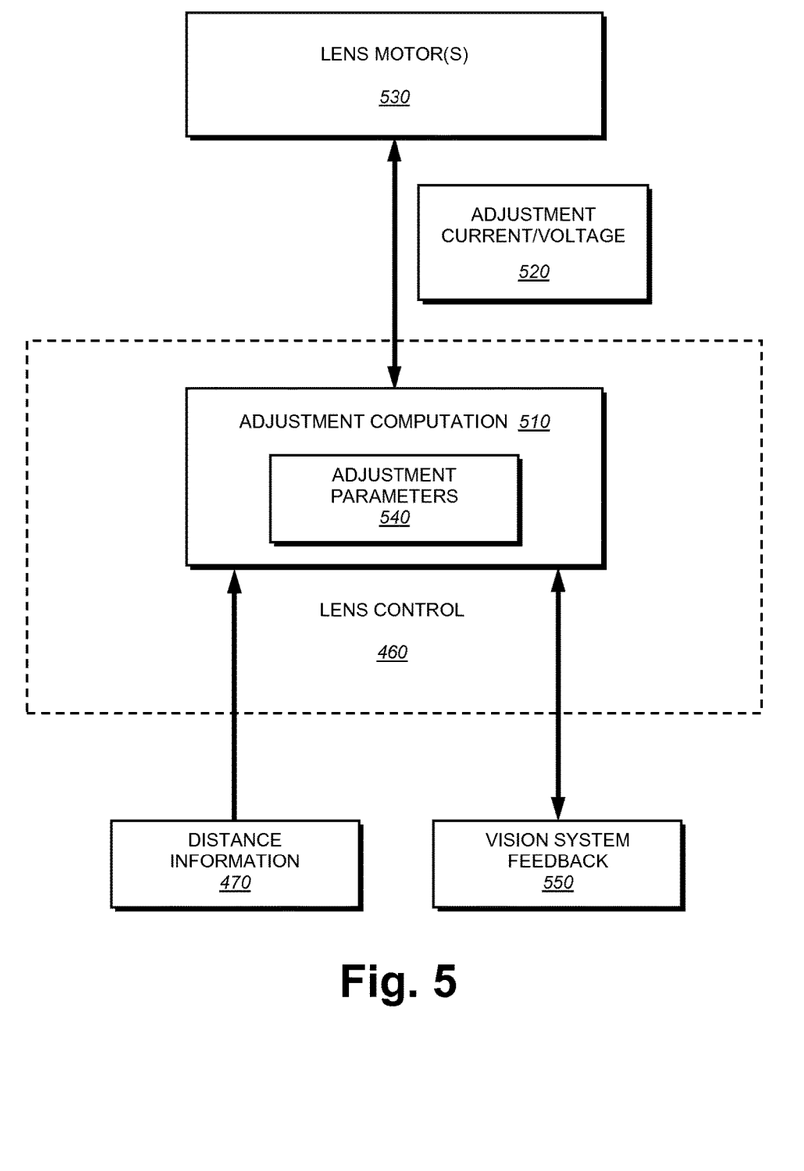
FIG. 5 is a block diagram showing an exemplary circuit arrangement for controlling adjustment of one or more variable/liquid lens assemblies according to an illustrative embodiment.

Referring again to FIG. 4, the liquid (variable) lens 430 is controlled by (e.g.) the vision processor and associated vision process 212 based upon the focus angle adjustment process(or)/module 242 described generally above. The focus angle adjustment process(or)/module 242 communicates with a variable (e.g. liquid) lens control process(or)/module 460 that can be part of the overall vision processor 212, or can be a separate unit. As described above, the vision processor 212 and focus angle adjustment module 242 receive input of distance information 470 from an appropriate distance-measurement arrangement, which typically determines the height of the top surface of the object under inspection. With further reference to FIG. 5, the distance information 470 is used to perform an adjustment computation using a computation module 510 that is part of the variable lens control module 460 and overall focus angle adjustment module. The computation module 510 can define an equation-based engine that computes the adjustment value for the lens based upon the input distance. Alternatively, the computation module can employ a look-up table that relates lens adjustment values (focal distances) to measured input distance and selects the appropriate adjustment value based upon the closest measured distance (or an interpolation between a plurality of closest measured distances. The lens adjustment value defines an input current and/or voltage 520 that drives the position/focus of the lens motor 530. This motor can include a magnetic coil or other actuation device appropriate to the mechanism of the lens. The computation module 510 can base its calculations on various adjustment parameters 540 that take into account, for example, the temperature of the lens system and optics, the intrinsic and extrinsic parameters of the camera, and/or any specific characteristics of the lens over the working range.

Optionally, the variable lens control 460 can base adjustment or confirm adjustment using feedback 550 from the acquired image of the object. This can be used to refine adjustment as appropriate. Various auto-focus algorithms—for example those that attempt to establish a crisp image based upon edge detection—can be employed.

Figure 6:
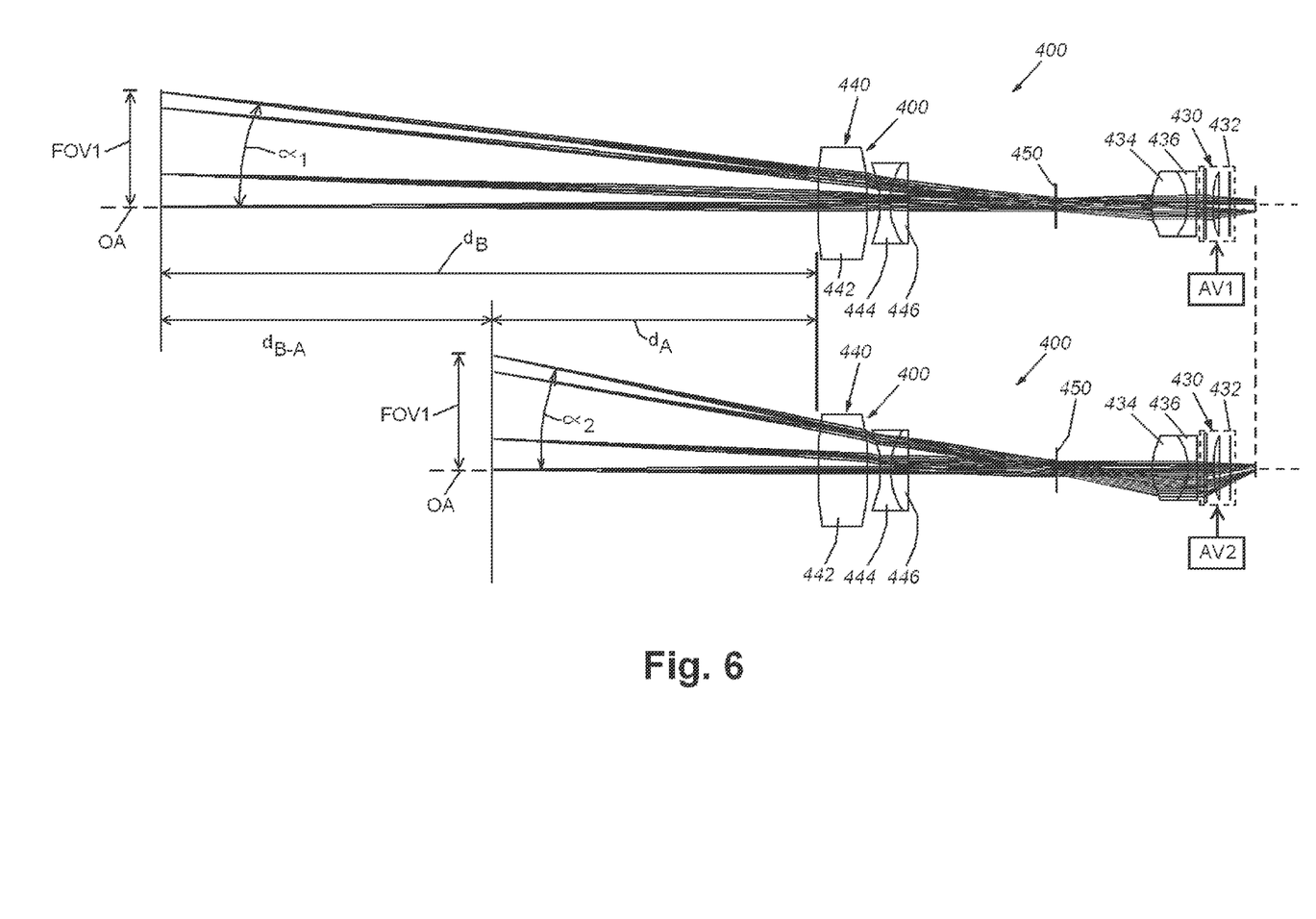
FIG. 6 is a side cross section of the lens arrangement and imager of FIG. 4 showing a constant field of view FOV for each of two different working distance settings with similar magnification.

FIG. 6 shows the optics arrangement 400 at two working distances, $d_B$ and $d_A$, in which a similar field of view FOV1 and constant magnification is defined for each working distance. This is based on the arrangement of optics in combination with the variable lens. To maintain the field of view FOV1 at each distance $d_B$ and $d_A$, the respective viewing angle α1 and α2 is varied as shown (with a wider angle for a closer working distance and a narrower angle for a further working distance). These focus settings are achieved by varying the variable (e.g. liquid) lens assembly 432 using specified adjustment values, AV1 and AV2, respectively. Other angles can be achieved using appropriate adjustment values as described above.

It should be clear that the lens assembly defined hereinabove enables the use of a single camera assembly for use in imaging a wide range of object heights by allowing rapid and accurate variation of the viewing angle with constant magnification throughout the desired range of working distances.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system. Accordingly, this description is meant to be taken only by way of example, and not to otherwise limit the scope of this invention.

What is claimed is:

1. A vision system for acquiring images of features of objects of varying height passing under a camera field of view in a transport direction comprising:
   a camera with an image sensor defining a height:width aspect ratio of at least 1:4;
   a lens assembly comprising a front lens group and a rear lens group, the front lens group including a front convex lens and a rear composite lens, the rear lens group comprising a variable lens element, the lens assembling being in optical communication with the image sensor and having an adjustable viewing angle at constant magnification within a predetermined range of working distances;
   a distance sensor that measures a distance between camera and at least a portion of object; and
   an adjustment module that adjusts the viewing angle based upon the distance.

2. The vision system as set forth in claim 1 wherein the distance sensor is based on at least one of LIDAR, sonar, stereo imaging, a light curtain and laser range-finding.

3. The vision system as set forth in claim 1 wherein the image sensor defines a height:width aspect ratio of at least approximately 1:8.

4. The vision system as set forth in claim 1 wherein the camera is arranged to image a top side of an object in relative motion, the top side being within a predetermined range of heights.

5. The vision system as set forth in claim 4 wherein the object is arranged on a moving conveyor.

6. The vision system as set forth in claim 4 further comprising a vision system processor that includes an ID decoder module.

7. The vision system as set forth in claim 6 wherein the top side of the object includes at least one ID thereon.

8. The vision system as set forth in claim 1 wherein the adjustment module adjusts a focal distance of the lens assembly concurrently with the viewing angle.

9. The vision system as set forth in claim 8 further comprising a vision processor that analyzes the features and performs a vision system task based upon the features.

10. The vision system as set forth in claim 9 wherein the features are ID features and the vision processor includes an ID decoder module.

11. The vision system as set forth in claim 10 wherein the camera is a single unit that images objects within a field of view thereof having varying heights and an ID located thereon.

12. The vision system as set forth in claim 8 wherein the variable lens element changes focal distance based upon an input adjustment value.

13. The vision system as set forth in claim 12 wherein the variable lens element comprises a liquid lens.

14. The vision system as set forth in claim 12 wherein the rear lens group has a composite lens.

15. The vision system as set forth in claim 12 wherein the front lens group is behind the front lens group, and wherein the front lens group is larger in diameter than the rear lens group, and wherein the variable lens element is located behind the rear lens group.

16. The vision system as set forth in claim 15 wherein an aperture having a predetermined diameter is located between the front lens group and the rear lens group.

17. The vision system as set forth in claim 16 wherein a front lens of the front lens group and a front lens of the rear lens group are separated by approximately 75 millimeters and the aperture has a diameter of approximately 4 millimeters.

18. A vision system for acquiring images of features of objects of varying height passing under a camera field of view in a transport direction comprising:
   a camera with an image sensor defining a height:width aspect ratio of at least 1:4;
   a lens assembly, in optical communication with the image sensor, having an adjustable viewing angle at constant magnification within a predetermined range of working distances, wherein the lens assembly has a front lens group and a rear lens group, behind the front lens group, wherein the front lens group includes a front convex lens and a rear composite lens;
   a distance sensor that measures a distance between camera and at least a portion of object; and
   an adjustment module that adjusts the viewing angle based upon the distance.

19. A vision system for acquiring images of features of objects of varying height passing under a camera field of view in a transport direction comprising:
   a camera with an image sensor defining a height:width aspect ratio of at least 1:4;
   a lens assembly, in optical communication with the image sensor, having an adjustable viewing angle at constant magnification within a predetermined range of working distances, wherein the lens assembly has a front lens group and a rear lens group, behind the front lens group, wherein the front lens group includes a front convex lens and a rear composite lens, wherein a front lens of the front lens group and a front lens of the rear lens group are separated by approximately 75 millimeters;
   an aperture having a predetermined diameter located between the front lens group and the rear lens group, the aperture having a diameter of approximately 4 millimeters;
   a distance sensor that measures a distance between camera and at least a portion of object; and an adjustment module that adjusts the viewing angle based upon the distance.

* * * * *